(12) United States Patent  (10) Patent No.: US 9,298,217 B2
Goemmer  (45) Date of Patent: Mar. 29, 2016

(54) PORTABLE HDMI MONITOR THAT DISPLAYS WHILE POWERING MOBILE DEVICES

(71) Applicant: GoSkreen L.L.C., Bellevue, WA (US)

(72) Inventor: Brian Roy Goemmer, Bellevue, WA (US)

(73) Assignee: GoSkreen L.L.C., Bellevue, WA (US)

( * ) Notice: Subject to any disclaimer, the term of this patent is extended or adjusted under 35 U.S.C. 154(b) by 32 days.

(21) Appl. No.: 14/191,210

(22) Filed: Feb. 26, 2014

(65) Prior Publication Data

US 2014/0313658 A1  Oct. 23, 2014

Related U.S. Application Data

(60) Provisional application No. 61/770,258, filed on Feb. 27, 2013.

(51) Int. Cl.
*H05K 5/00* (2006.01)
*G06F 1/16* (2006.01)

(52) U.S. Cl.
CPC ............ *G06F 1/1632* (2013.01); *G06F 1/1605* (2013.01)

(58) Field of Classification Search
CPC ... G06F 1/1632; G06F 1/1607; G06F 1/1626; G06F 3/14; G06F 1/1616; H04M 1/72527
See application file for complete search history.

(56) References Cited

U.S. PATENT DOCUMENTS 8,811,008 B2 *  8/2014  Selkirk et al. ............ 361/679.41
2013/0279106 A1 * 10/2013  Ergun et al. ............... 361/679.26

OTHER PUBLICATIONS

"Hangatablet—The Patented Mounting Solution for Your Mobile Devices," Launch.it News, Nov. 12, 2013, <http://launch.it/launch/hangatablet-the-patented-mounting-solution-for-your-mobile-devices> [retrieved Dec. 20, 2013], 2 pages.

* cited by examiner

*Primary Examiner* — Tuan T Dinh
*Assistant Examiner* — Hung Dang
(74) *Attorney, Agent, or Firm* — Christensen O'Connor Johnson Kindness PLLC

(57) ABSTRACT

A system comprises three major components including a portable monitor, a housing, and a removable shelf. The portable monitor is suitable to display HDMI data coming from mobiles devices. The portable monitor also includes an electrical source to charge mobile devices, such as smartphones, while HDMI data is displayed.

16 Claims, 16 Drawing Sheets

PORTABLE HDMI MONITOR THAT DISPLAYS WHILE POWERING MOBILE DEVICES

CROSS-REFERENCE TO RELATED APPLICATION

This application claims the benefit of Provisional Application No. 61/770258, filed Feb. 27, 2013, which is incorporated herein by reference.

TECHNICAL FIELD

The present subject matter is related to monitors, and more particularly, it relates to a housing and a portable monitor to display data from mobile devices while powering them.

BACKGROUND

A monitor or display is an electronic visual display for computing devices. The monitor comprises the display device, circuitry, and an enclosure. The modern monitor is typically a thin film liquid transistor crystal display thin panel, while older monitors use a cathode ray tube about as deep as a screen size. Originally, computer monitors were used for data processing, while television receivers were used for entertainment. From the 1980's onward, computers and their monitors have been used for both data processing and entertainment, while televisions have implemented some computer functionality.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aspect of the present subject matter includes a system form which recites a system for displaying data while powering a mobile device. The system comprises a portable monitor, the hardware structure of which is suitable for displaying HDMI data through an HDMI port while powering a mobile device through a USB port. The system also comprises a housing having a capacity to house the portable monitor. The system further comprises a removable shelf being capable of engaging the housing so that the mobile device rests on the removable shelf while its data is displayed on the portable monitor and its power is charged by the portable monitor.

Another aspect of the present subject matter includes another system form which recites a system for housing a portable monitor. The system comprises a housing having a capacity to house a portable monitor. The system further comprises a removable shelf being capable of engaging the housing so that a mobile device rests on the removable shelf while its data is displayed on the portable monitor and its power is charged by the portable monitor.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
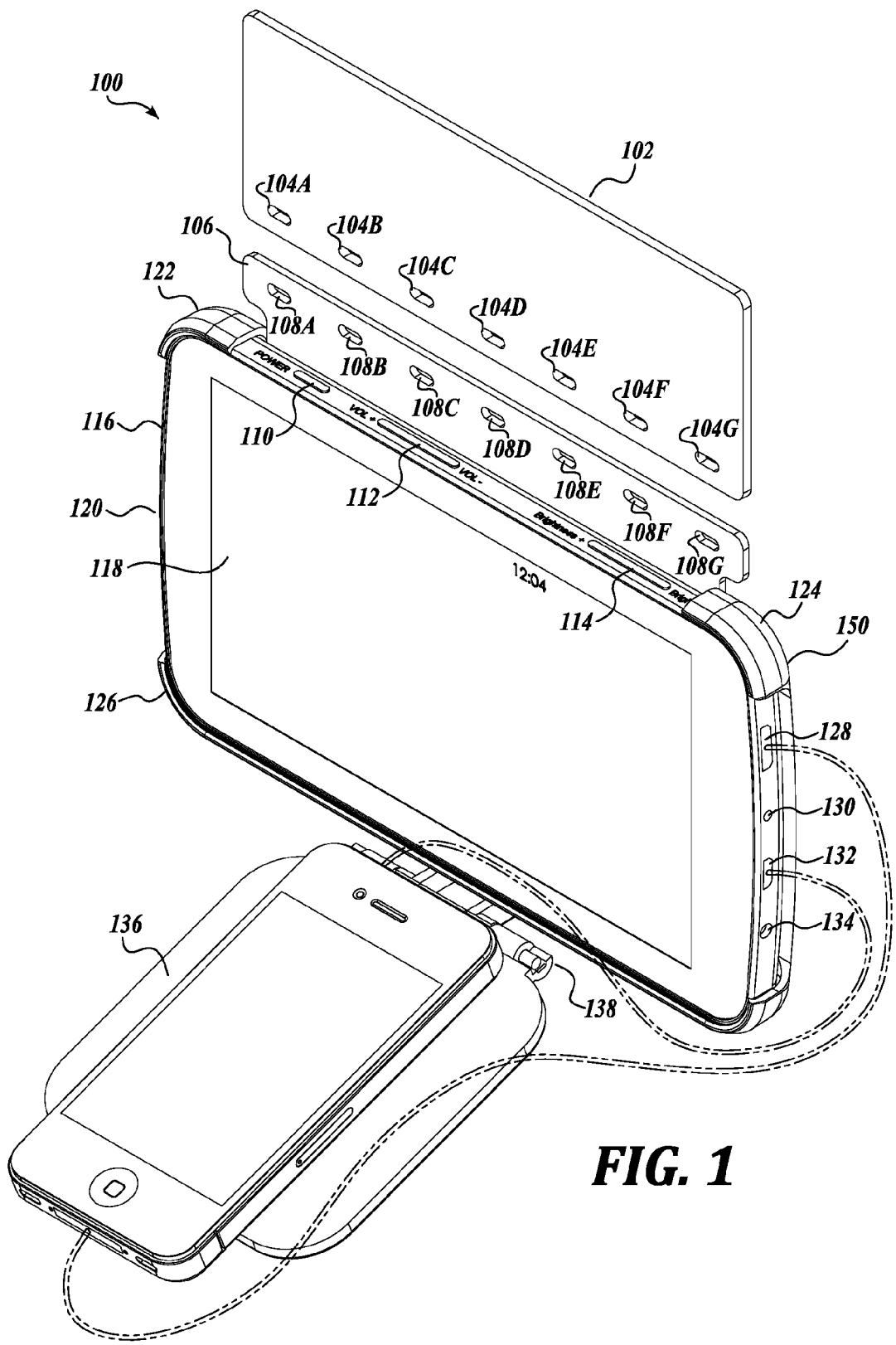
FIG. 1 is a front perspective view of the present subject matter.
Figure 2:
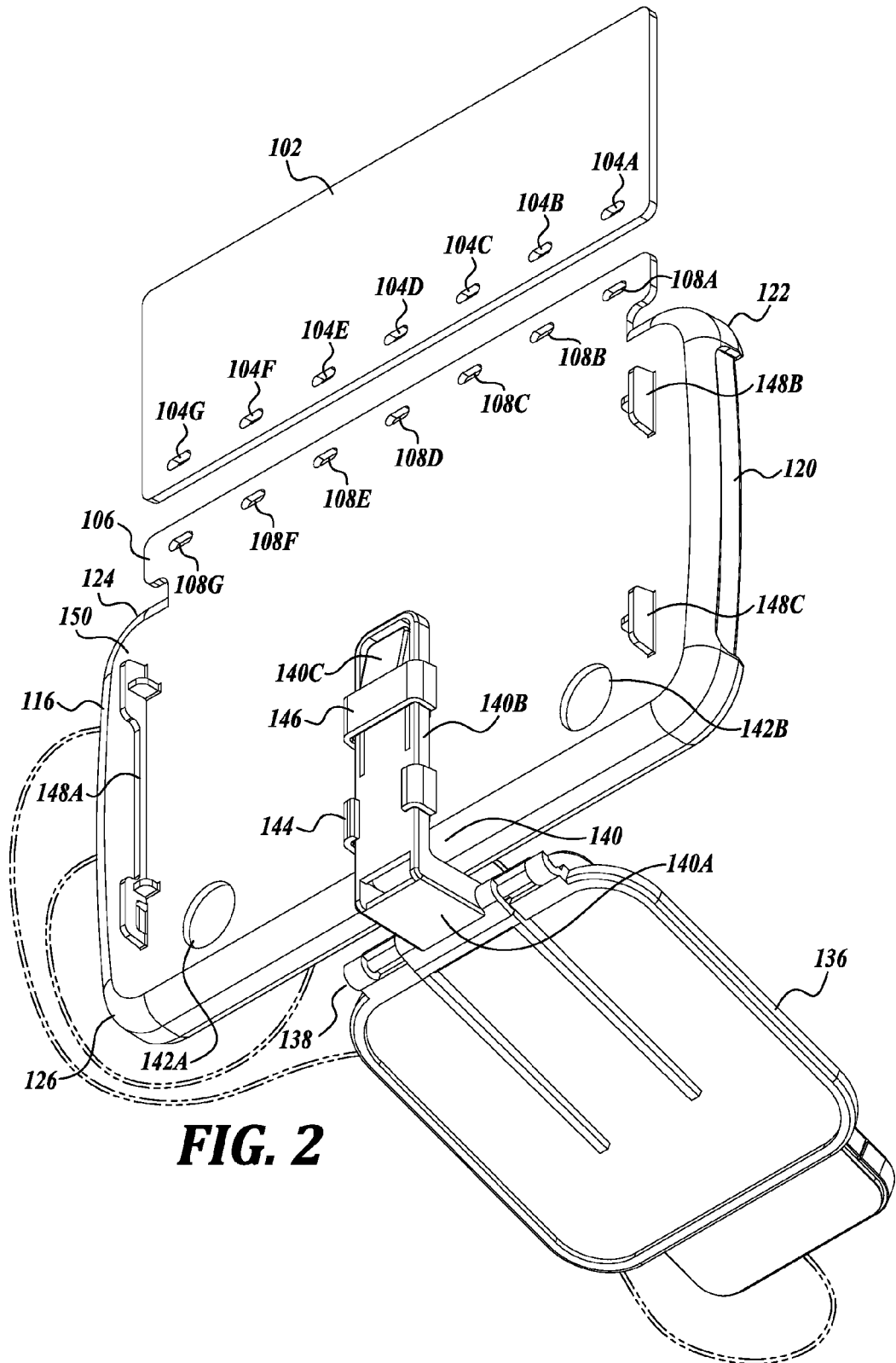
FIG. 2 is the rear perspective view of the present subject matter.
Figure 3:
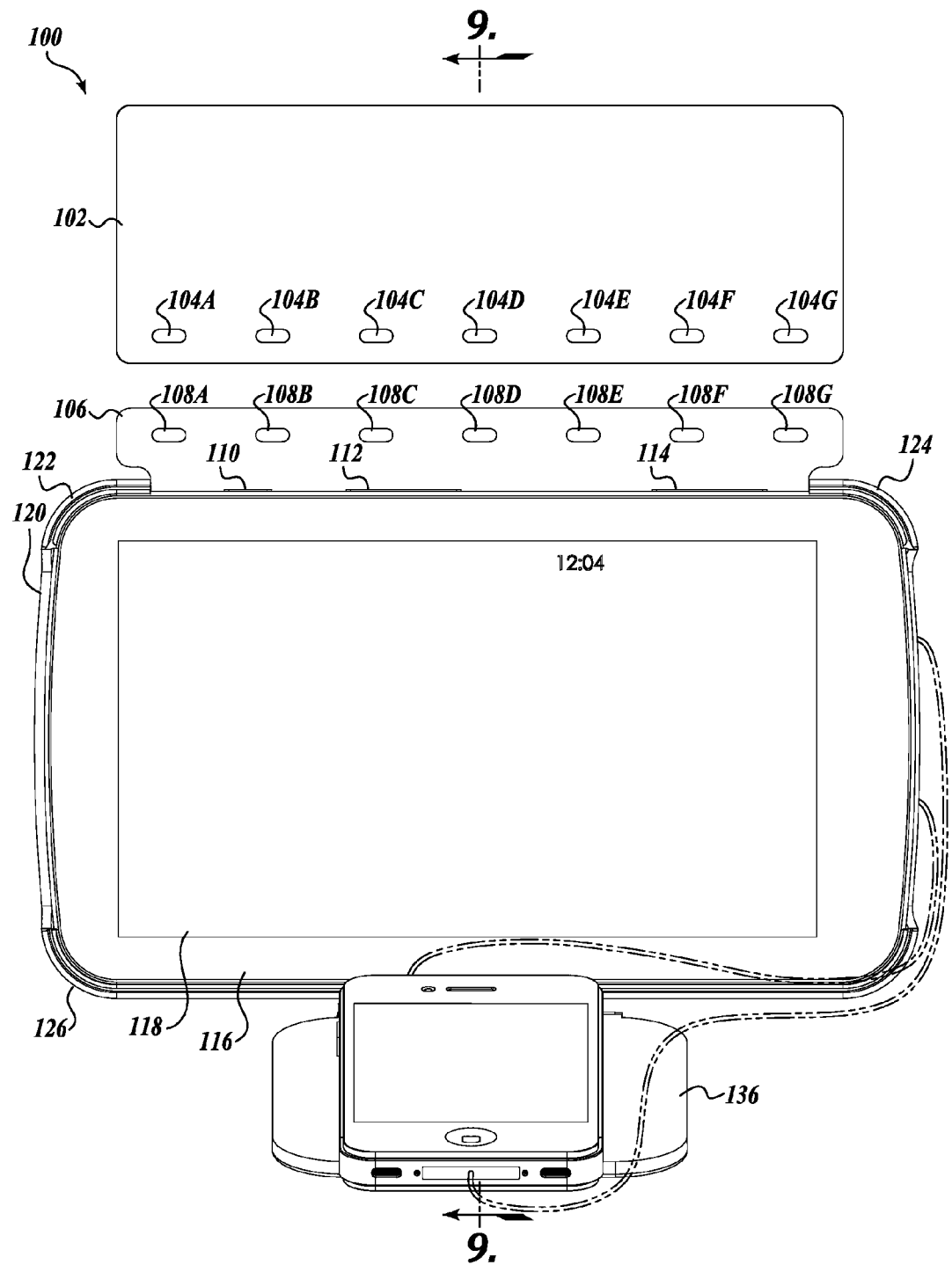
FIG. 3 is a front view of the present subject matter.
Figure 4:
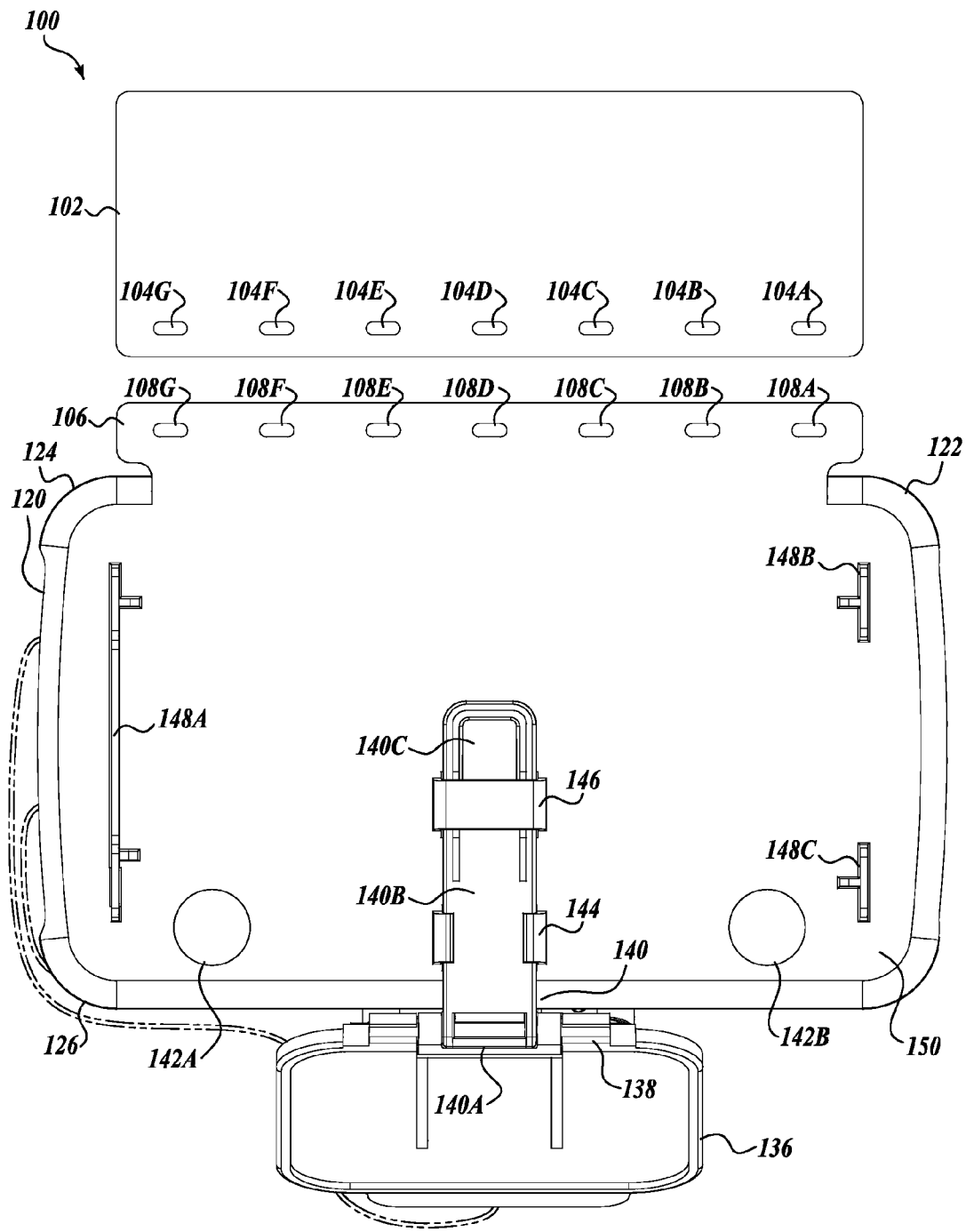
FIG. 4 is the rear view of the present subject matter.
Figure 5:
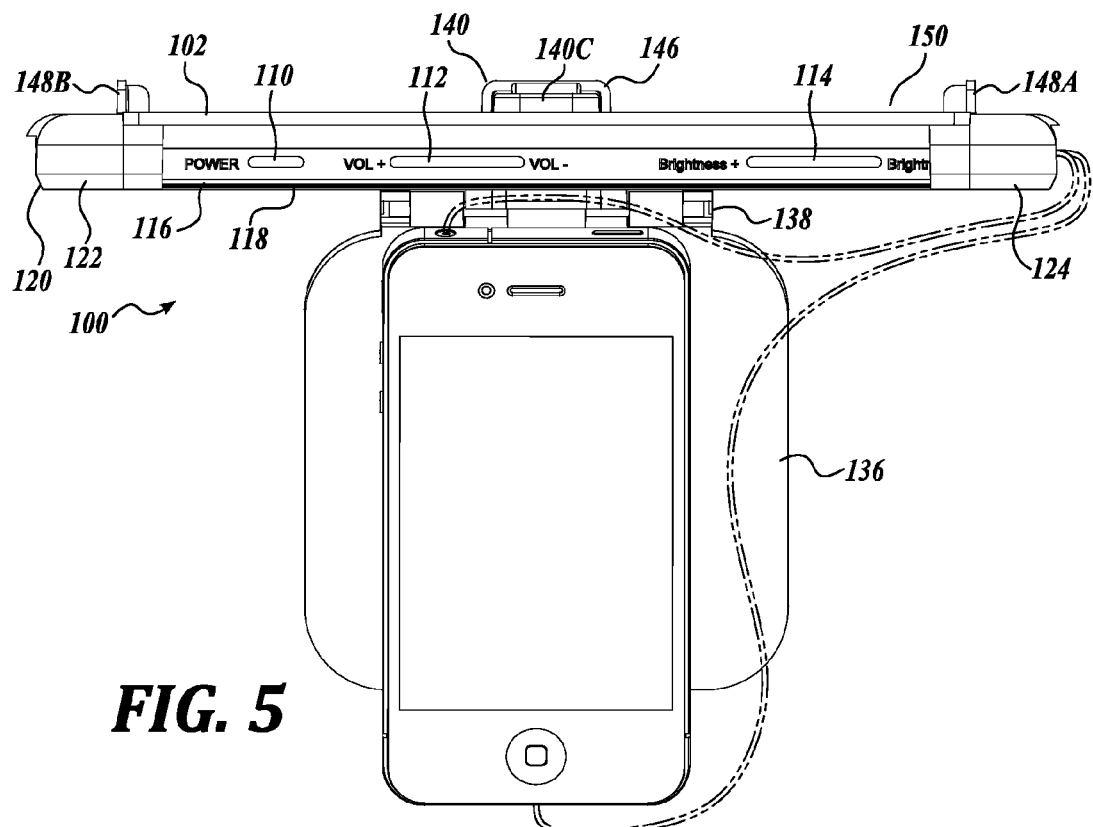
FIG. 5 is a top plan view of the present subject matter.
Figure 6:
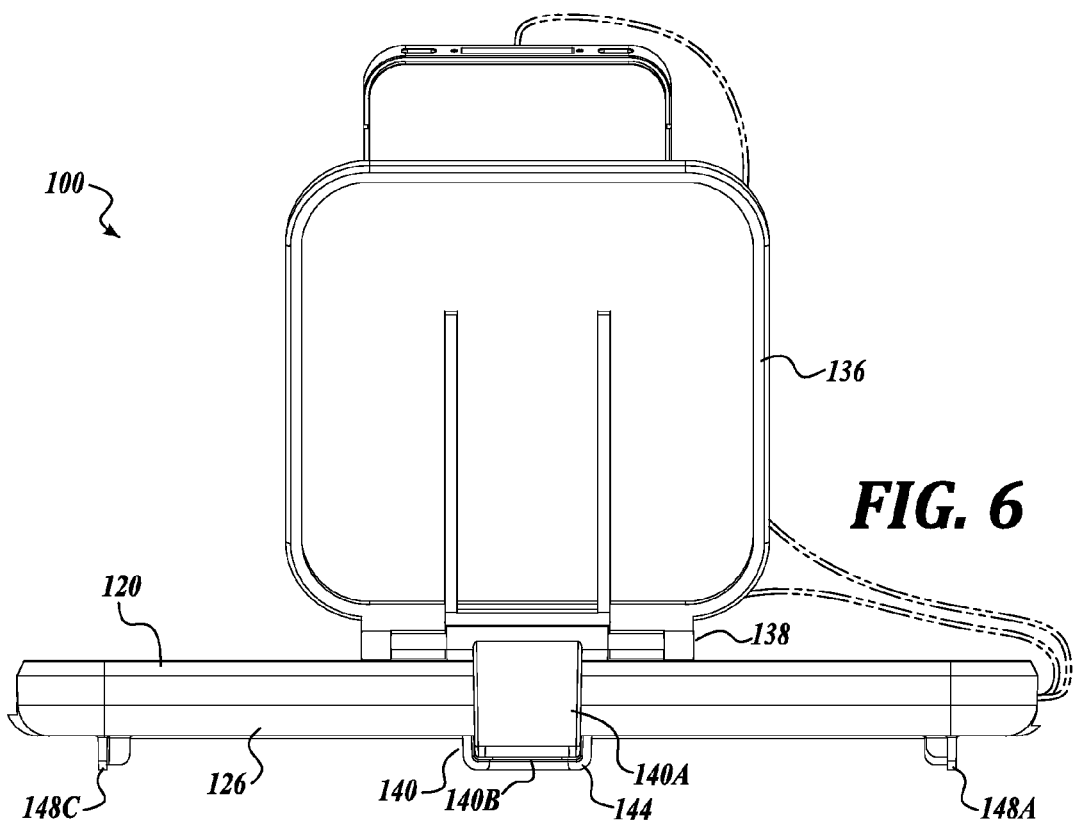
FIG. 6 is a plan bottom view of the present subject matter.
Figure 7:
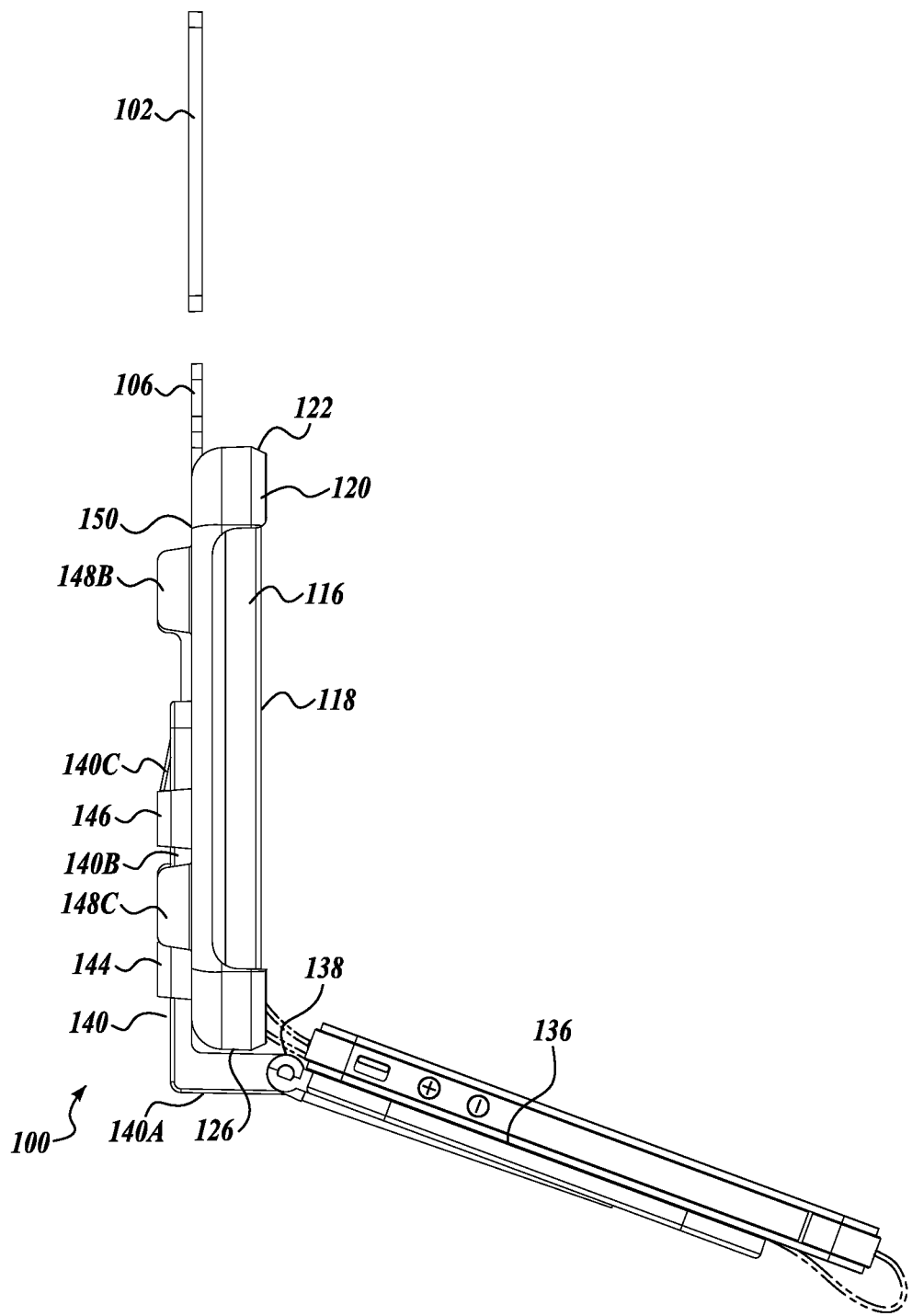
FIG. 7 is a side view of the present subject matter.
Figure 8:
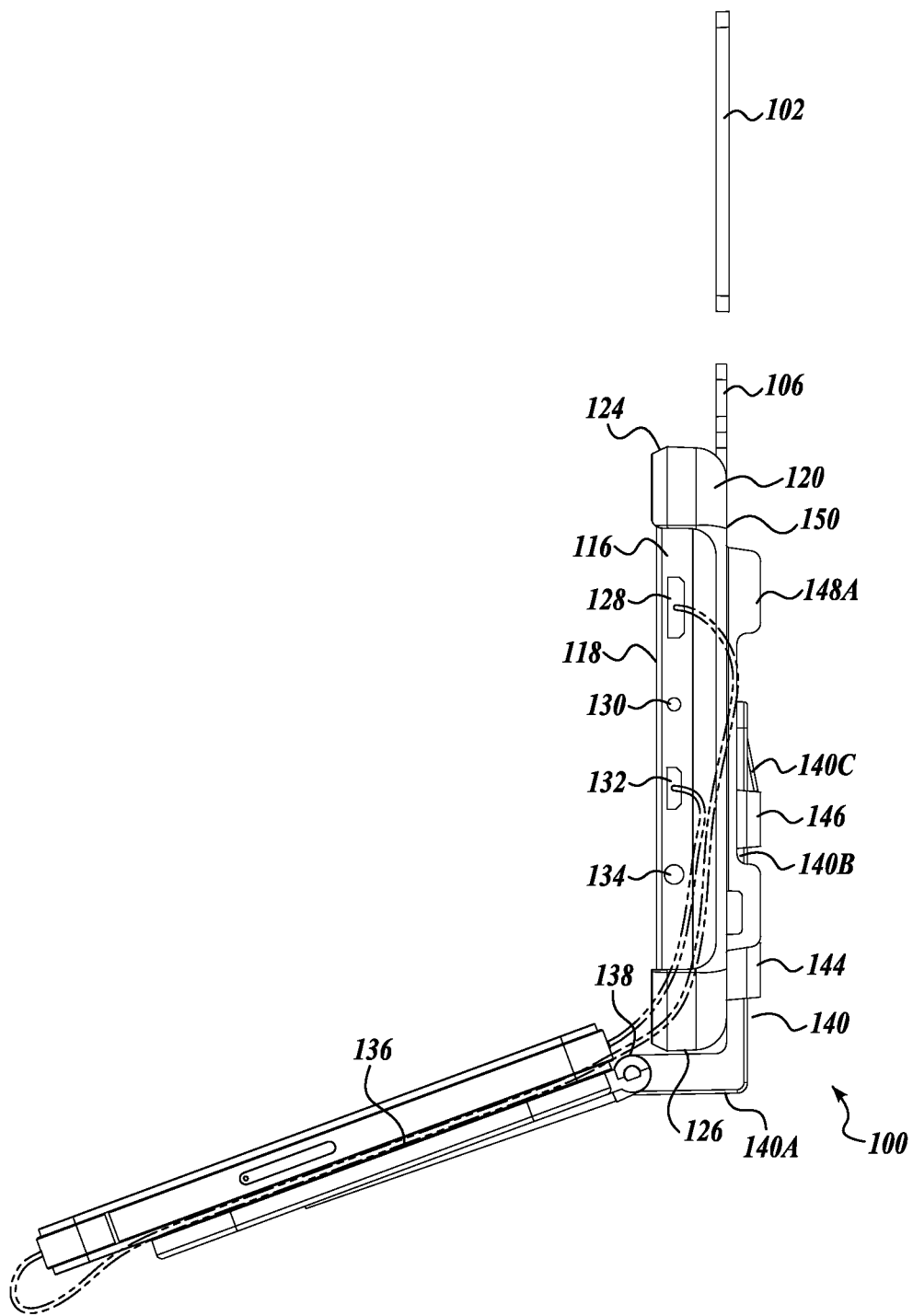
FIG. 8 is a side view of the present subject matter.
Figure 9:
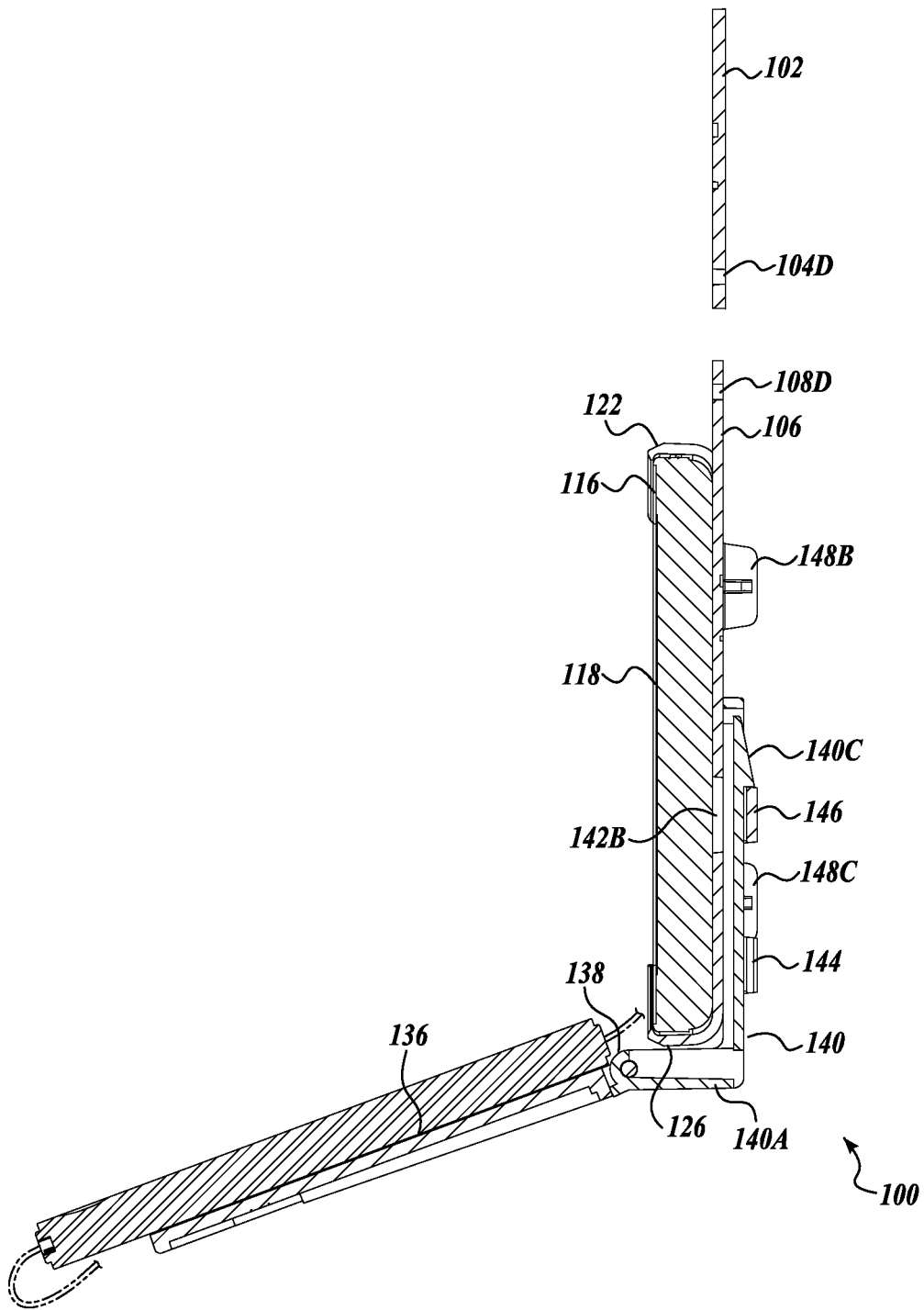
FIG. 9 is a cross-sectional view of the present subject matter.
Figure 10:
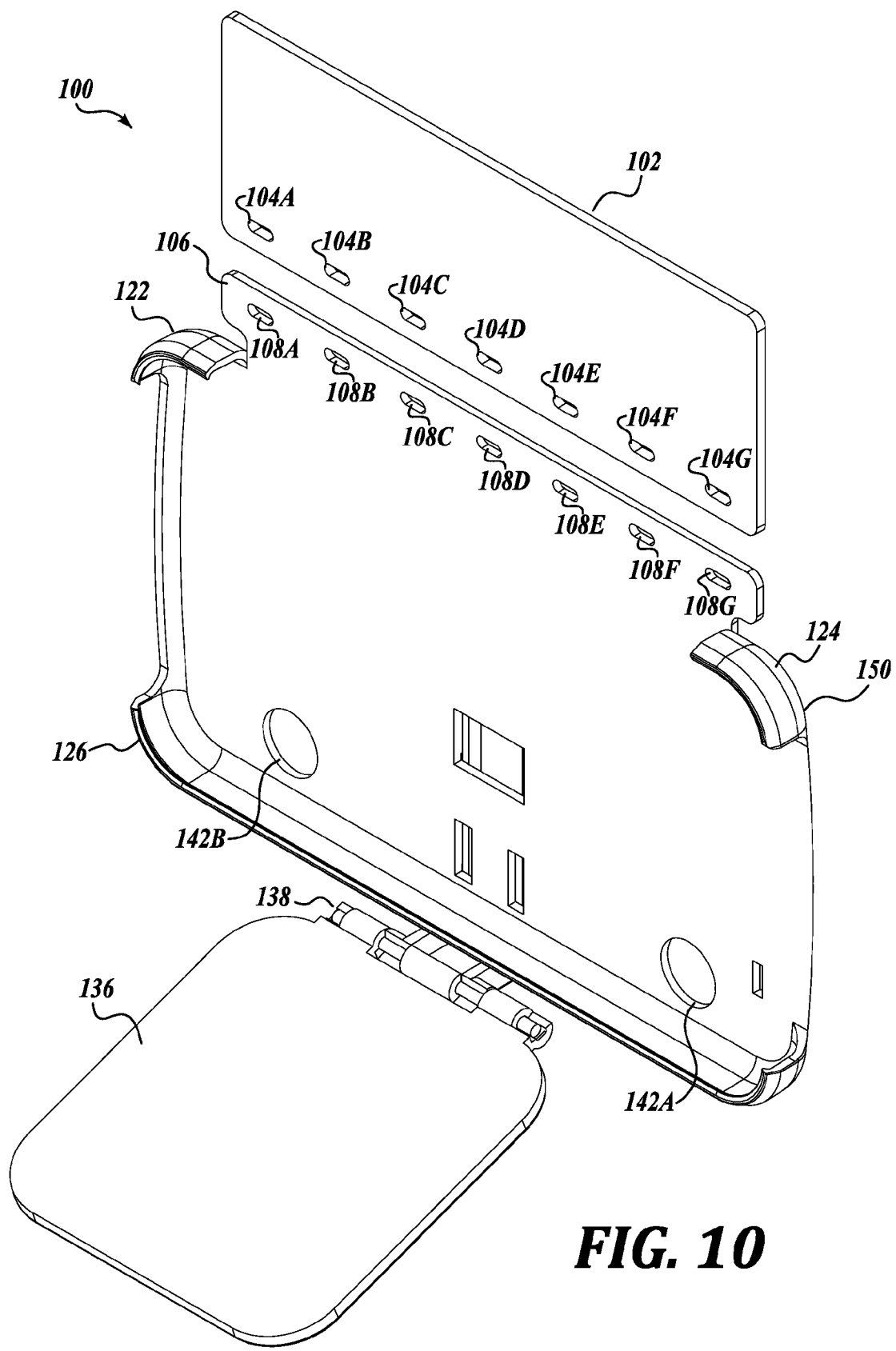
FIG. 10 is a front perspective view of an exemplary housing.
Figure 11:
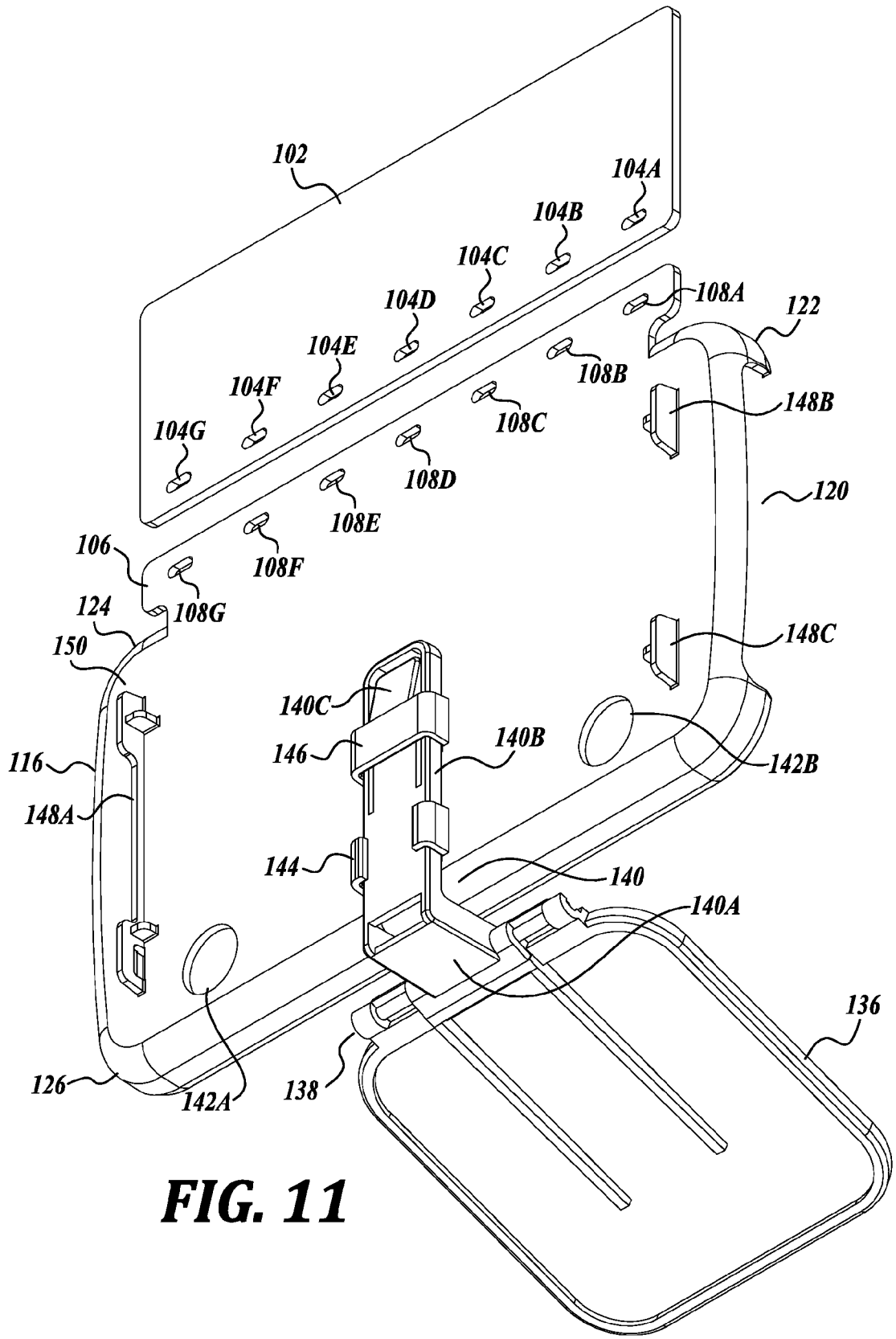
FIG. 11 is a rear perspective view of the exemplary housing.
Figure 12:
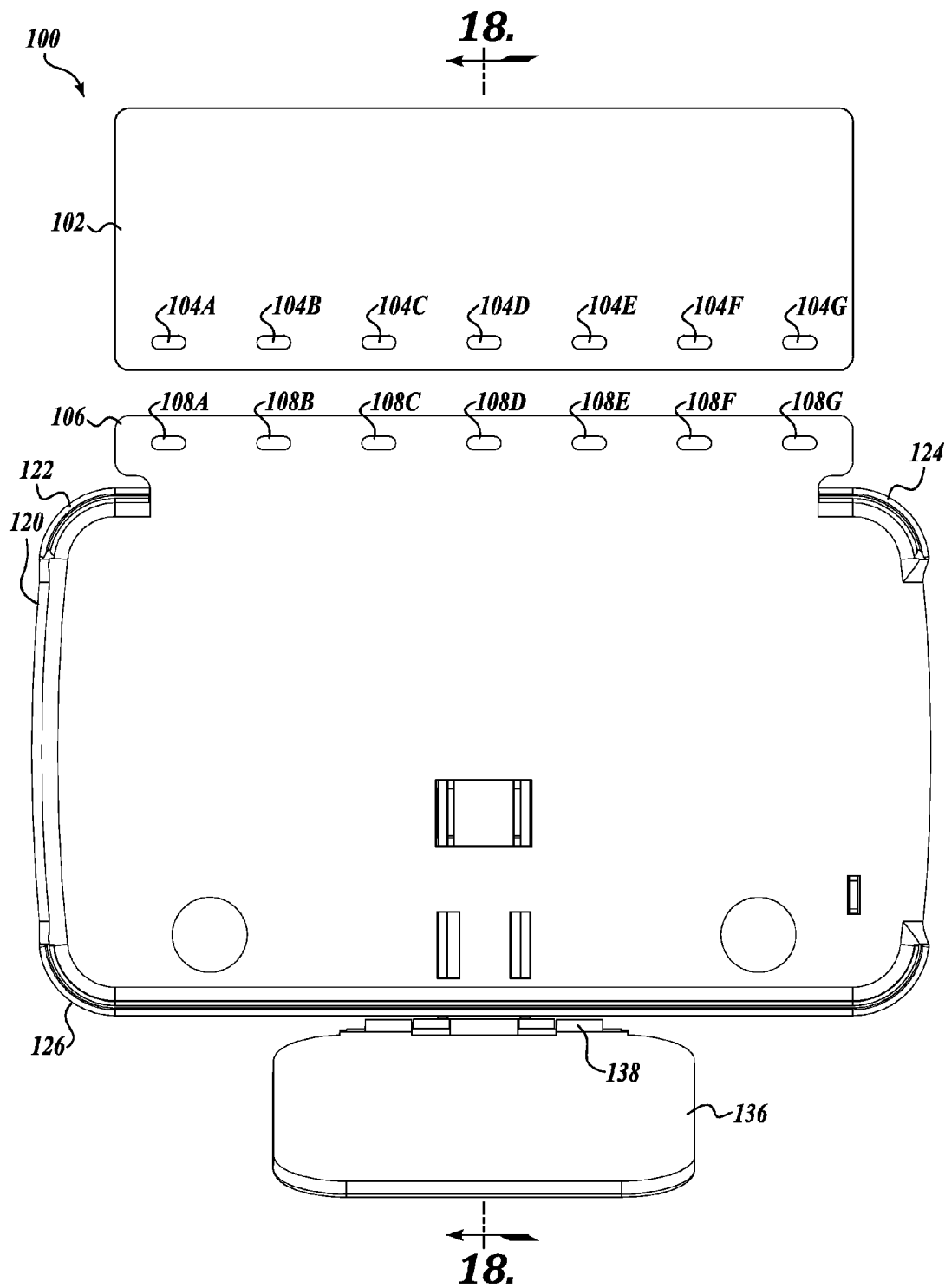
FIG. 12 is a front view of the exemplary housing.
Figure 13:
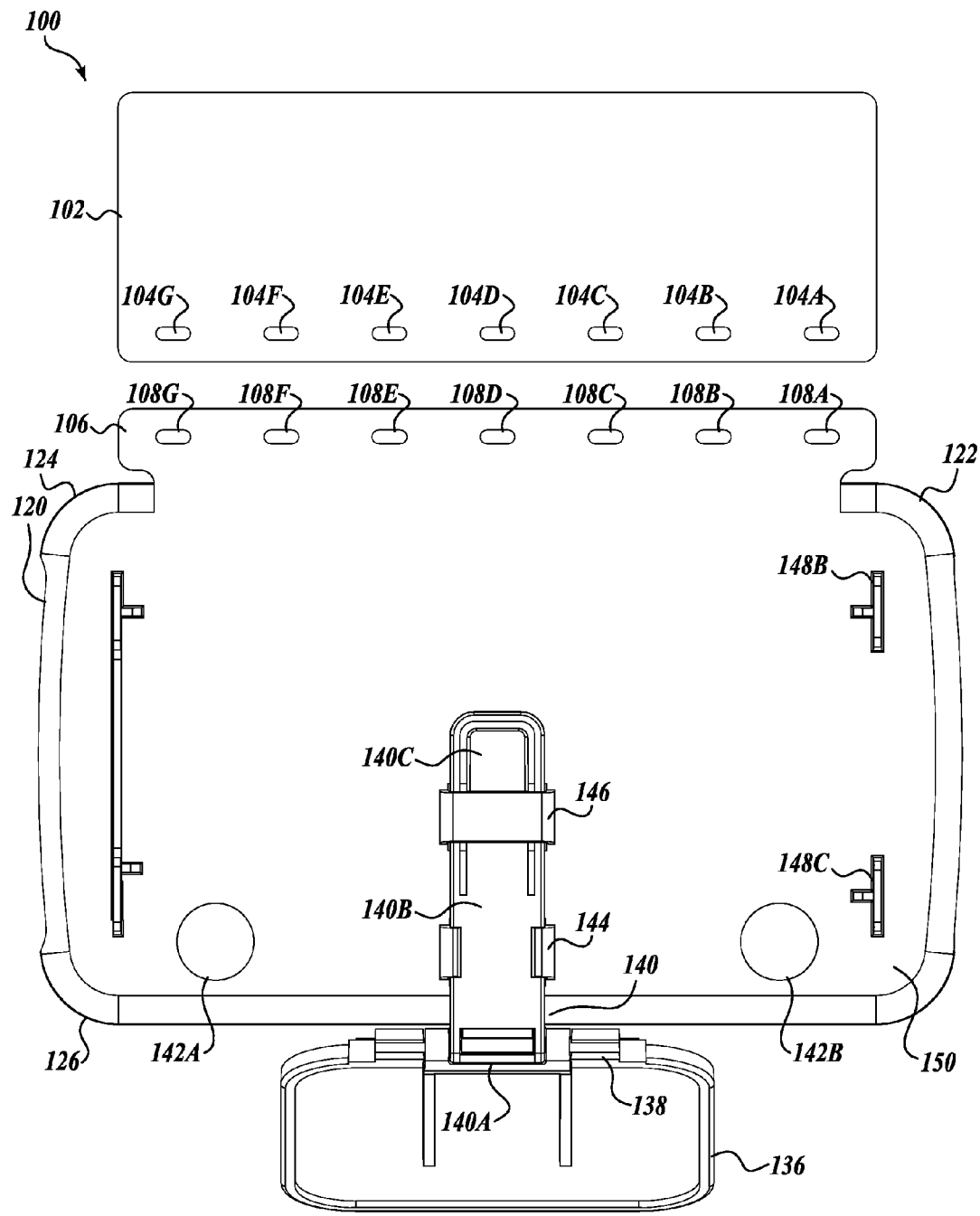
FIG. 13 is a rear view of the exemplary housing.
Figure 14:
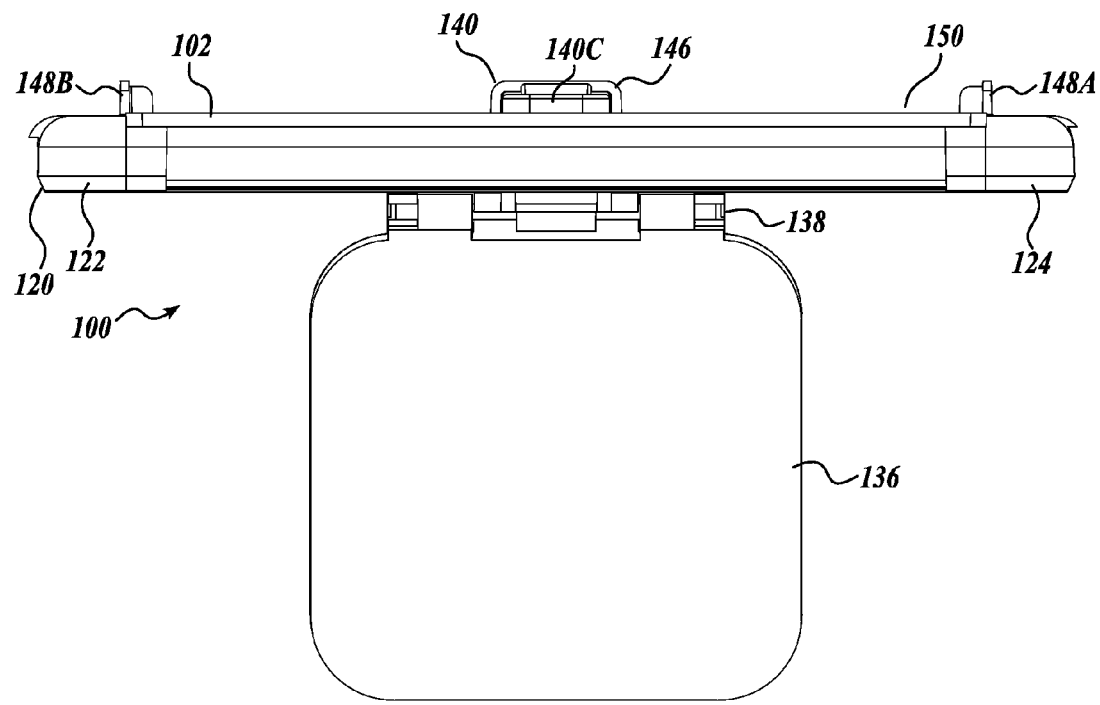
FIG. 14 is a top plan view of the exemplary housing.
Figure 15:
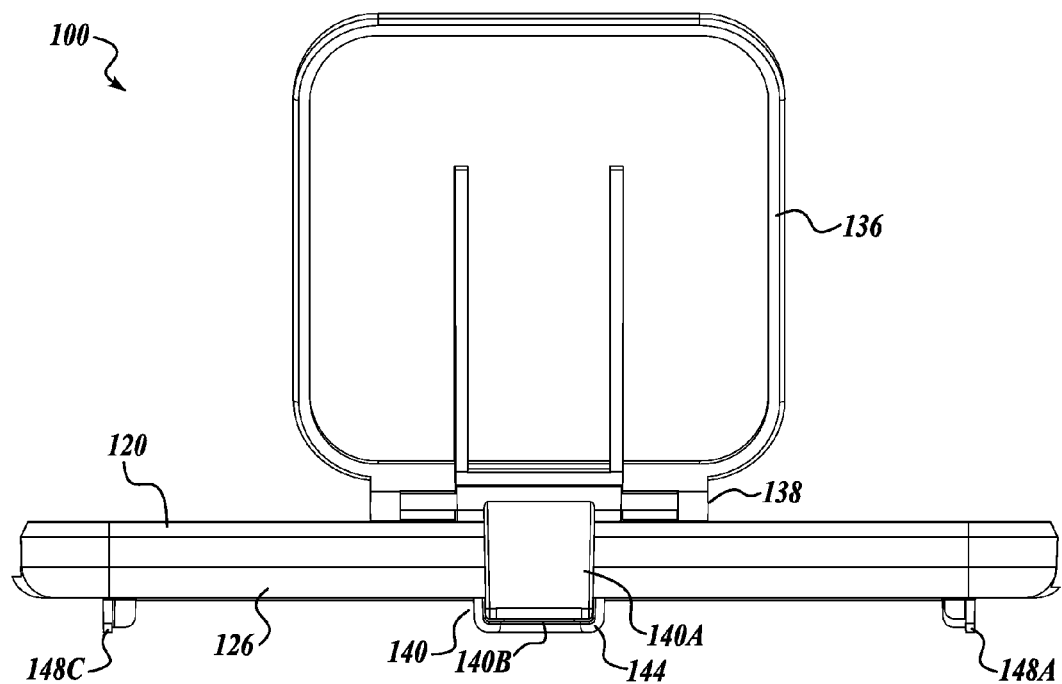
FIG. 15 is a bottom view of the exemplary housing.
Figure 16:
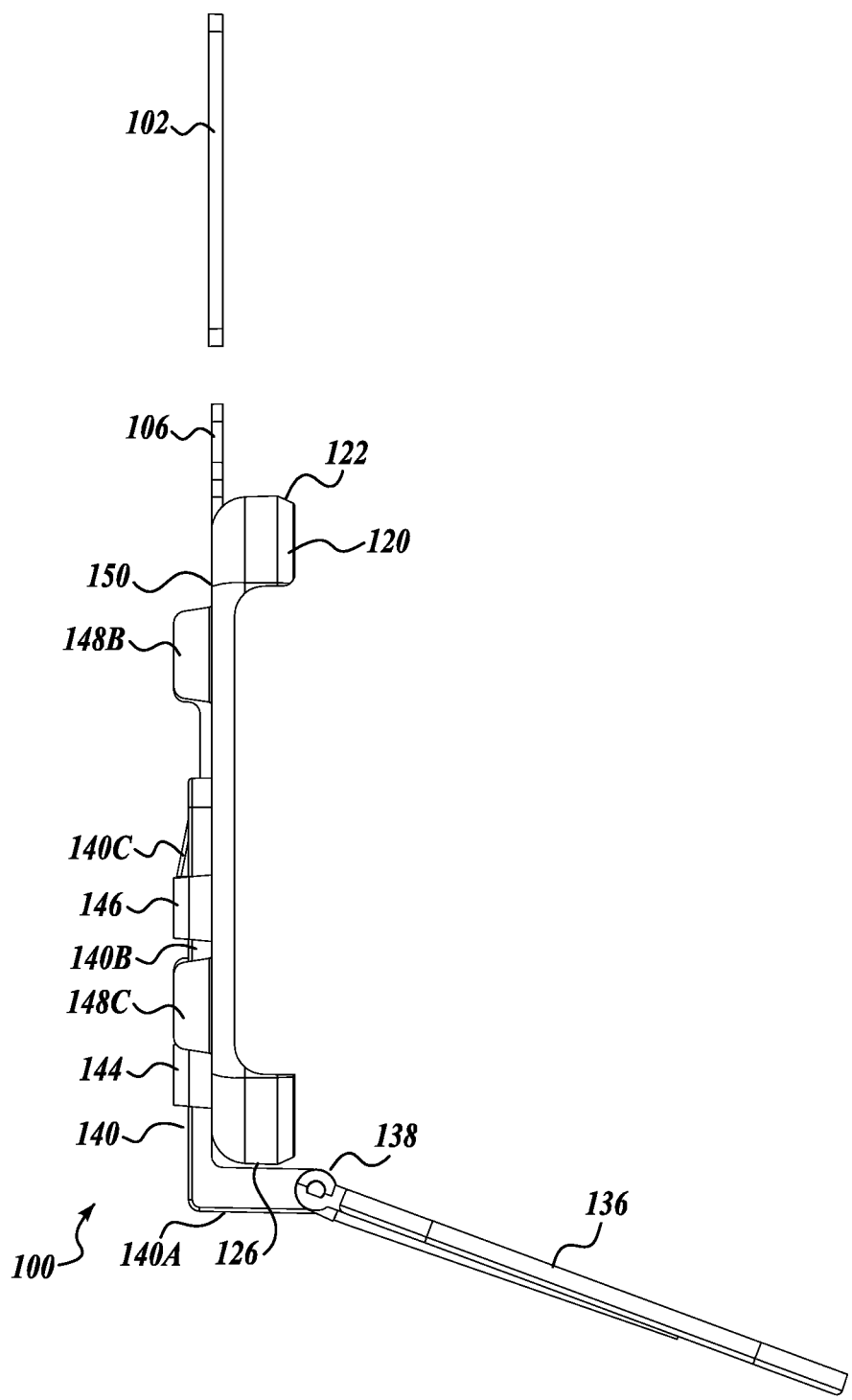
FIG. 16 is a side view of the exemplary housing.
Figure 17:
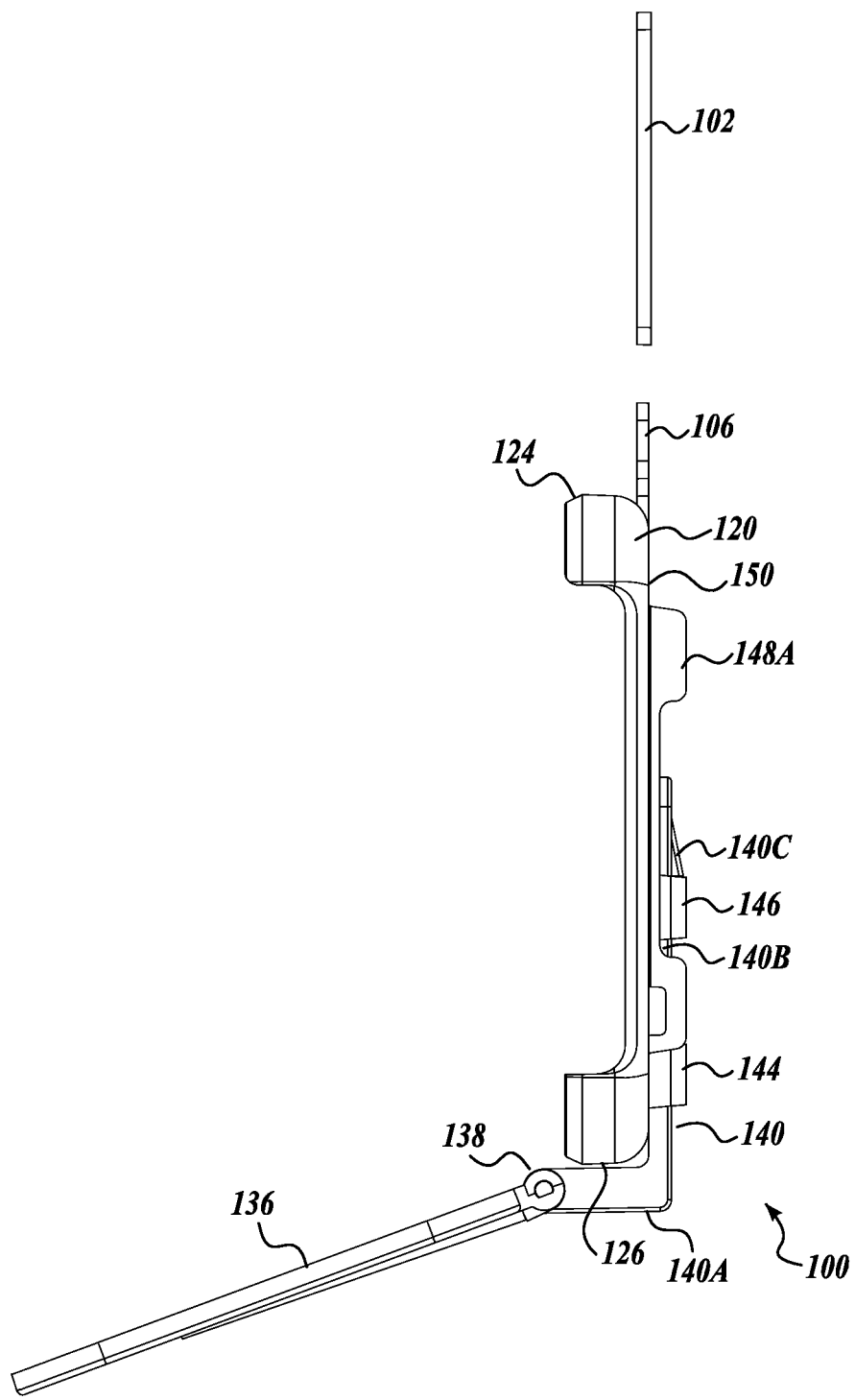
FIG. 17 is a side view of the exemplary housing.
Figure 18:
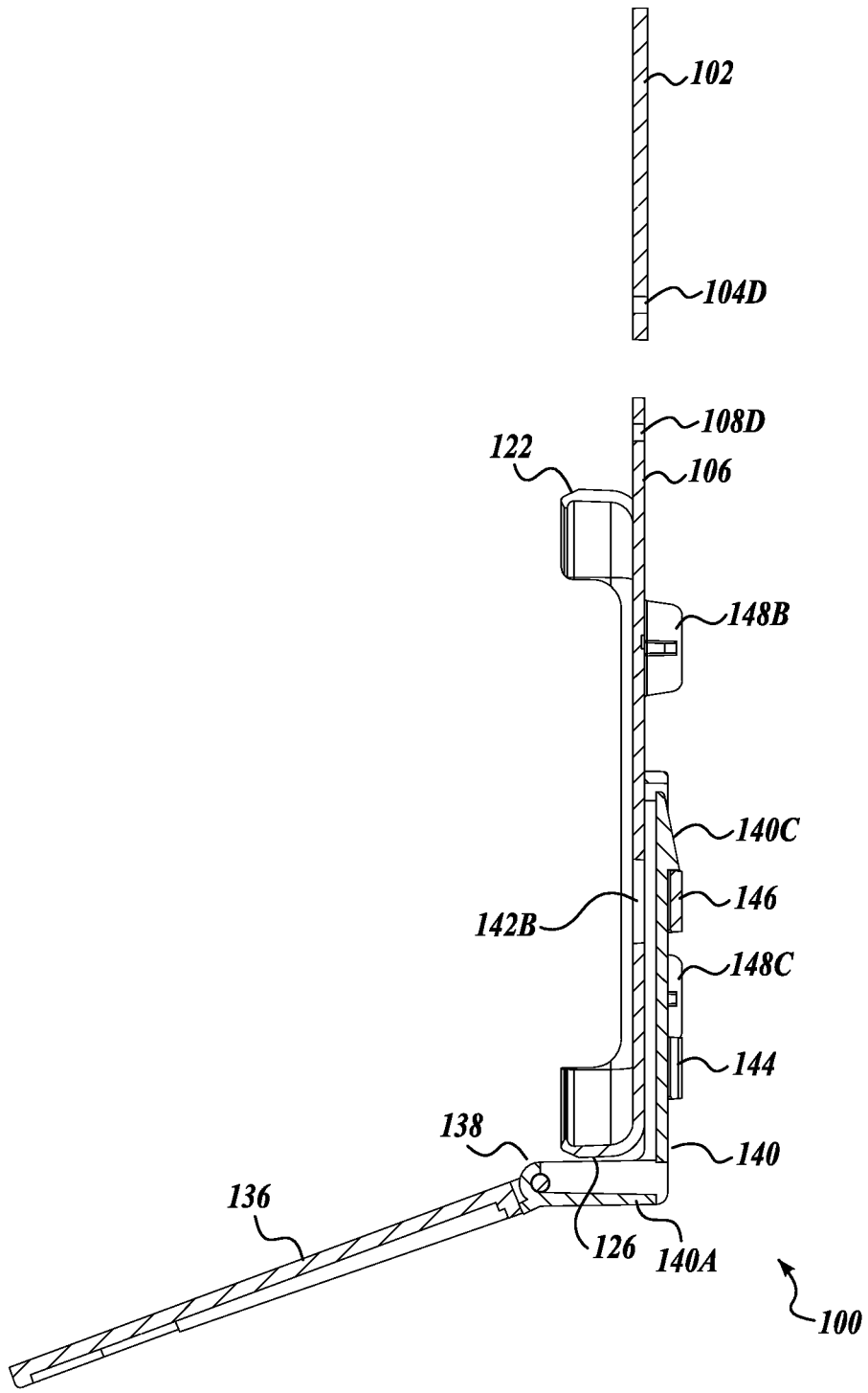
FIG. 18 is a cross-sectional view of the exemplary housing.

FIGS. 1-18 illustrate a system 100 comprising three major components including a portable monitor 116, a housing 120, and a removable shelf 136. The portable monitor includes an electrical source (not shown) to charge mobile devices, such as smartphones. Conventional HDMI monitors are getting larger and larger to satisfy television viewing demands of customers or other customers who have data on computer desktops. Many of these HDMI monitors operate on AC charges by plugging an electrical cord into a wall outlet to tap AC electrical sources. Because of its size and weight, conventional HDMI is not suitable for portability. It also is not designed to provide power to charge mobile devices or their adapters.

In one embodiment, the portable monitor 116 has dimensions of approximately 193.5 by 109.8 by 11.1 millimeters. In other embodiments, the portable monitor 116 may be larger or smaller as long as it is portable. The portable monitor 116 includes a battery compartment (not shown) to provide DC power in mobile/portable scenarios where AC power in unavailable, a power button 110, a volume button 112, a brightness button 114, a micro HDMI port 128 suitable for interfacing to HDMI connections from mobile devices, a DC power port 130 suitable to interface to an automobile adapter (12 Volts) or an AC source (120 Volts), a micro USB charging port 132 suitable for providing a charging current to connected mobile devices or adapters (e.g., 5 Volts and 2 Amperes), and a 3.5 mm headset port 134. The portable monitor 116 includes a screen 118. The screen 118 is rectangular in form where one side is longer than the other side. The portable monitor 116 includes a left speaker and a right speaker located in the back (not shown).

The portable monitor 116 is housed in a housing 120. In several embodiments, the housing is made from hard plastic. In a few embodiments, the housing is made from Polytetrafluoroethylene. The housing 120 includes a T-shaped handle 106 with multiple handle slots 108A-108G, the handle slots being spaced apart. The system 100 also includes a hanger 102 which includes multiple hanger slots 104A-104G, the hanger slots being spaced apart and in corresponding parallel relationship with respective handle slots. Not shown are straps that engage the hanger 102 to the T-shaped handle 106 when ends of the straps are attached to corresponding handle slots, hanger slots. When engaged, the hanger is suitable for acting as a counterweight to counterbalance the housing 120 in which the portable monitor 116 is housed. The hanger 102 prevents over-balancing so that the portable monitor 116 in its housing 120 is located at a visual height desired by the users. Instead of acting as a counterweight, the hanger 102 may be fastened to a mobile mount in a few embodiments.

The housing 120 includes a left shoulder 122 and a right shoulder 124 as well as a bottom support 126. The left shoulder 122 has a C-shaped form against whose eccentric void rests a corner of the portable monitor 116. The C-shaped form of the left shoulder 122 includes two termini which are manufactured to shorten the C-shaped form of the left shoulder 122 to reveal the buttons and sides of the portable monitor 116. The right shoulder 124 also has a C-shaped form against whose eccentric void rests another corner of the portable monitor 116. The C-shaped form of the right shoulder 124 includes two termini which are manufactured to shorten the C-shaped form of the right shoulder 124 to reveal the buttons and sides of the portable monitor 116. The bottom support 126 is engineered to form longitudinally along a side of the housing 120 to terminate into C-shaped termini. The C-shaped termini have eccentric voids against which rest the remaining two corners of the portable monitor 116.

The system 100 includes a removable shelf 136 that lies substantially perpendicular to the housing 120, although in a few embodiments it lies at a slight angle, such as 91 to 95 degrees. In some embodiments, an adhesive cling is engineered on the removable shelf 136 to provide temporary fastening to a mobile device resting on it. A foldup hinge 138 couples the removable shelf 136 to an arm 140. The hinge 138 facilitates termination of swing beyond 90 degrees so as to allow a mobile device to rest on the removable shelf 136 when it is fully extended away from the housing 120. The hinge 138 also facilitates the swinging of the removable shelf 136 against the housing 120 to rest it there. The arm 140 includes an upper arm 140B and a forearm 140A, as well as a snap lock 140C engineered into the upper arm 140B. The forearm 140A is engineered to be orthogonal to the upper arm 140B. The upper arm 140B is fastened to a back 150 of the housing 120 via a C-shaped bracket 144 and a D-shaped bracket 146. In other words, the upper arm 140B is inserted into the C-shaped bracket 144 and further into the D-shaped bracket 146 until the snap lock 140C is fastened against the D-shaped bracket 146. The removable shelf 136 can be disengaged from the housing 120 by releasing the snap lock 140C, sliding the upper arm 140 from the D-shaped bracket 146 and the C-shaped bracket 144. The housing 120 includes tabs 148A-148C which act to distance the back 150 away from a supporting wall. Two speaker orifices 142A and 142B are present in the housing 120.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for displaying data while powering a mobile device, comprising:
   a portable monitor, the hardware structure of which is suitable for displaying HDMI data through an HDMI port while powering a mobile device through a USB port;
   a housing having a capacity to house the portable monitor; and
   a removable shelf being capable of engaging the housing so that the mobile device rests on the removable shelf while its data is displayed on the portable monitor and its power is charged by the portable monitor, wherein the removable shelf is coupled to an arm via a foldup hinge, the foldup hinge facilitating a swinging of the removable shelf so it rests at an angle with respect to the housing, wherein the arm includes a forearm and an upper arm as well as a snap lock, the forearm being orthogonal to the upper arm, the forearm being joined to the foldup hinge.

2. The system of Claim 1, wherein the housing has a back and a set of brackets, the set of brackets being suitable to receive the upper arm until the snap lock is fastened to a bracket of the set of brackets.

3. The system of claim 2, wherein members of the set of brackets are selected from C-shaped brackets and D-shaped brackets, wherein a C-shaped bracket is the first bracket through which the upper arm slides.

4. The system of claim 1, further comprising tabs mounted on a back of the housing which are capable of distancing the housing from a supporting wall.

5. The system of claim 1, wherein the portable monitor includes a power button, a volume button, a brightness button, a DC power port, a 3.5 mm headset port, and a battery compartment, as well as left and right speakers.

6. The system of claim 1, wherein the housing includes a left shoulder, a right shoulder, and a bottom support, each shoulder having a C-shaped form against whose eccentric void rests a corner of the portable monitor, the bottom support forming longitudinally along a side of the housing to terminate into C-shaped termini, the C shaped termini having eccentric voids against which rest the remaining two corners of the portable monitor.

7. The system of claim 6, wherein the housing further comprises a T-shaped handle with multiple handle slots, each handle slot being spaced apart.

8. The system of claim 7, further comprising a hanger which includes multiple hanger slots, each hanger slot being spaced apart and in corresponding parallel relationship with a handle slot.

9. The system of claim 8, further comprising straps that engage the hanger to the T-shaped handle when ends of the straps are attached to corresponding handle slots or hanger slots.

10. A system for housing a portable monitor, comprising:
    a housing having a capacity to house a portable monitor; and
    a removable shelf being capable of engaging the housing so that a mobile device rests on the removable shelf while its data is displayed on the portable monitor and its power is charged by the portable monitor, wherein the removable shelf is coupled to an arm via a foldup hinge, the foldup hinge facilitating a swinging of the removable shelf so it rests at an angle with respect to the housing, wherein the arm includes a forearm and an upper arm as well as a snap lock, the forearm being orthogonal to the upper arm, the forearm being joined to the foldup hinge.

11. The system of claim 10, wherein the housing has a back and a set of brackets, the set of brackets being suitable to receive the upper arm until the snap lock is fastened to a bracket of the set of brackets.

12. The system of claim 11, wherein members of the set of brackets are selected from C-shaped brackets and D-shaped brackets, wherein a C-shaped bracket is the first bracket through which the upper arm slides.

13. The system of claim 10, further comprising tabs mounted on a back of the housing which are capable of distancing the housing from a supporting wall.

14. The system of claim 10, wherein the housing includes a left shoulder, a right shoulder, and a bottom support, each shoulder having a C-shaped form against whose eccentric void rests a corner of the portable monitor, the bottom support forming longitudinally along a side of the housing to terminate into C-shaped termini, the C shaped termini having eccentric voids against which rest the remaining two corners of the portable monitor.

15. The system of claim 14, wherein the housing further comprises a T-shaped handle with multiple handle slots, the handle slots being spaced apart.

16. The system of claim 15, further comprising a hanger which includes multiple hanger slots, the hanger slots being spaced apart and in corresponding parallel relationship with respective handle slots.

\* \* \* \* \*